United States Patent
Veen et al.

(10) Patent No.: US 8,925,887 B2
(45) Date of Patent: Jan. 6, 2015

(54) MOTOR MOUNT

(75) Inventors: Gerald Raymond Veen, Holland, MI (US); Thomas David Novitsky, Northville, MI (US); Kristen Clements, Lexington Park, MD (US)

(73) Assignee: Johnson Controls Technology Company, Holland, MI (US)

( * ) Notice: Subject to any disclaimer, the term of this patent is extended or adjusted under 35 U.S.C. 154(b) by 923 days.

(21) Appl. No.: 13/121,459

(22) PCT Filed: Oct. 1, 2009

(86) PCT No.: PCT/US2009/059245
§ 371 (c)(1),
(2), (4) Date: May 25, 2012

(87) PCT Pub. No.: WO2010/039968
PCT Pub. Date: Apr. 8, 2010

(65) Prior Publication Data
US 2012/0280104 A1    Nov. 8, 2012

Related U.S. Application Data

(60) Provisional application No. 61/102,612, filed on Oct. 3, 2008.

(51) Int. Cl.
*B60N 2/00* (2006.01)
*B60N 2/06* (2006.01)
*B60N 2/02* (2006.01)
*B60N 2/16* (2006.01)

(52) U.S. Cl.
CPC .............. *B60N 2/067* (2013.01); *B60N 2/0232* (2013.01); *B60N 2/1615* (2013.01); *B60N 2002/024* (2013.01); *B60N 2205/20* (2013.01)
USPC .......................................... 248/424; 248/674

(58) Field of Classification Search
USPC ........... 248/674, 638, 424, 429; 74/89, 89.23, 74/89.35
See application file for complete search history.

(56) References Cited

U.S. PATENT DOCUMENTS

| | | | | |
|---|---|---|---|---|
| 5,150,872 | A | * | 9/1992 | Isomura ......................... 248/429 |
| 5,348,262 | A | * | 9/1994 | Isomura ......................... 248/430 |
| 5,433,734 | A | | 7/1995 | Stokes |

(Continued)

FOREIGN PATENT DOCUMENTS

FR    2883810    10/2006

OTHER PUBLICATIONS

English abstract to FR 2 883 810.

*Primary Examiner* — Steven Marsh
(74) *Attorney, Agent, or Firm* — Butzel Long

(57) ABSTRACT

A bracket 34 for mounting a motor 32 to a vehicle seat assembly 20. The bracket including a body portion 53 having a first end 46 and a second end 48 for attachment to a vehicle seat assembly 20; a recess 54 located at the first end 46 of the body portion 53 for housing a motor 32; an attachment rib 56 extending vertically from the body portion 53 and located in the recess 54, the attachment rib 56 for attaching to the motor 32 and securing the motor 32 within the recess 54; and an attachment member 62 extending horizontally from the body portion 53 and into the recess 54, the attachment member 62 for insertion into the motor 32 and interlocking the motor 32 thereto.

12 Claims, 14 Drawing Sheets

(56) References Cited

U.S. PATENT DOCUMENTS

| | | | |
|---|---|---|---|
| 5,487,520 A * | 1/1996 | Mouri et al. | 248/429 |
| 5,523,917 A * | 6/1996 | Searby | 361/679.48 |
| 6,808,233 B2 * | 10/2004 | Mallard | 297/344.1 |
| 6,959,900 B2 * | 11/2005 | Hoshihara et al. | 248/429 |
| 2004/0094683 A1 * | 5/2004 | Garrido et al. | 248/424 |
| 2008/0163708 A1 | 7/2008 | Porinsky et al. | |

* cited by examiner

MOTOR MOUNT

CROSS REFERENCE TO RELATED APPLICATIONS

This international application claims the benefit of and priority to U.S. Provisional Patent Application No. 61/102,612, filed Oct. 3, 2008, titled: MOTOR MOUNT, in the name of Veen et al. the entire disclosure of which is incorporated by reference herein.

BACKGROUND

The present disclosure, as currently understood, generally relates to the field of seats and in particular to vehicle seats. More specifically, the present disclosure relates to an adjuster (power track assembly) for a vehicle seat.

Vehicle seat assemblies are typically provided with a track system that adjusts vehicle seat assembly in the forward and rearward directions. Such adjustment capability is desirable to enable vehicle operators of various sizes to be seated comfortably within the motor vehicle. Generally such track systems include two track assemblies. Each track assembly includes two track members that move relative to one another. Some track systems include a latch mechanism that locks the track members (and therefore the seat assembly) in a locked position relative to one another until the latch mechanism is released. The track members may be selectively moved relative to one another, which enables the occupant of the seat assembly to adjust the seat assembly to a new position.

Generally vehicle seat assemblies include powered adjusters, such as electric motors for powering adjuster mechanisms, so a user may adjust the various aspects of the vehicle seat. One example is the powered track assembly for adjusting the fore and aft position and/or the vertical position of the seat supported thereby. A powered track assembly facilitates entry (ingress) and exit (egress) from the vehicle, enhances comfort, and/or provides a means to otherwise meet the needs and desires of the user. The powered vehicle seat track assembly typically includes a threaded member (or lead screw) connected between the track members of the track assembly, a motor for actuating the threaded member and a transmission for transferring motion of the motor to adjust the vehicle seat track members of the track assembly. In one type of track assembly arrangement, the lead screw may generally be fixed to the track members such that it does not rotate. A transmission is provided on the lead screw and includes a worm gear assembly rotatably coupled to the lead screw. A motor is connected to the worm gear to rotate it and causing the transmission to translate along the fixed, non-rotating lead screw to cause relative motion of the track members of the track assembly to adjust the vehicle seat. While such devices are known there remains a significant and continuing need to provide an improved powered seat track assembly and vehicle seat that facilitates installation and mounting, enhances performance, and has a lower manufacturing cost.

SUMMARY

In one exemplary embodiment, a bracket for use in mounting an adjuster motor to a vehicle seat assembly is disclosed. The bracket includes a body portion having a first end and a second end for attachment to the vehicle seat assembly, a recess is provided and located at the first end of the body portion for housing a motor, an attachment rib extends substantially vertically from the body portion and is at least partially located in the recess, the attachment rib for use in attaching and securing the motor within the recess; and an attachment member extending horizontally from the body portion and into the recess, the attachment member for insertion into the motor and interlocking the motor thereto.

In another exemplary embodiment, there is disclosed a vehicle seat assembly having a seat base frame having a first and second side frame member, the first and second side frame member positioned parallel to one another; a track assembly coupled to the first and second side frame member, the track assembly having a first upper track member in slidable engagement with a first lower track member and a second upper track member in slidable engagement with a second lower track member; a bracket having a first end coupled to the first upper track member and a second end coupled to the second upper track member; and a motor housed within the bracket, the motor for adjusting the fore and aft position of the first and second upper track member relative to the first and second lower track member.

DETAILED DESCRIPTION

Figure 1:
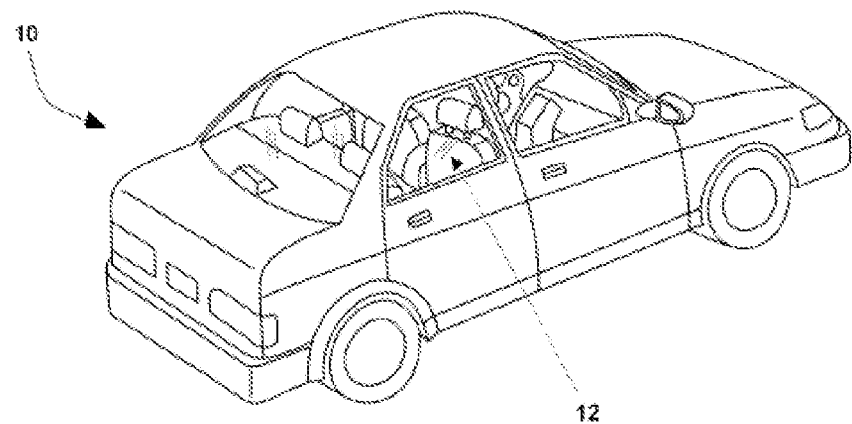
FIG. 1 is a perspective view of a vehicle having a seat assembly according to an exemplary embodiment.
Figure 2:
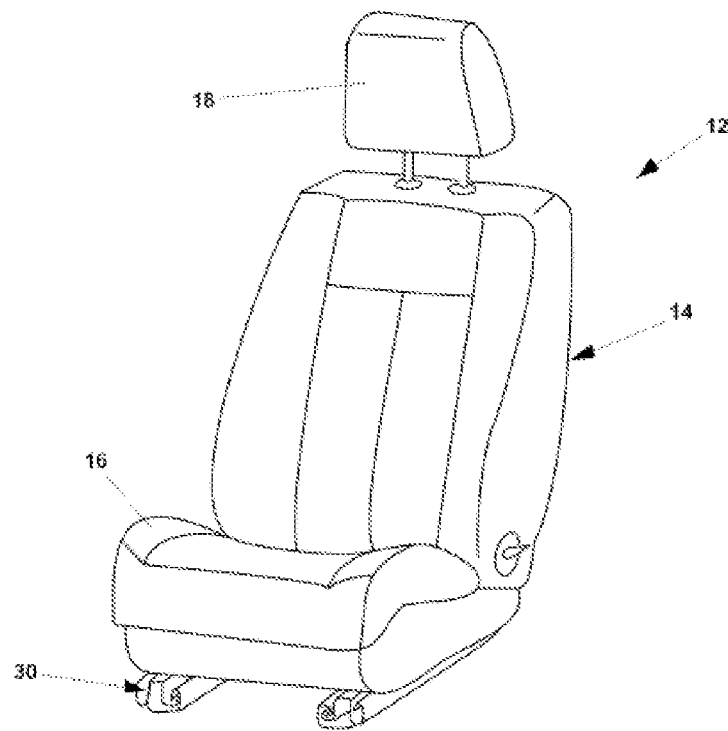
FIG. 2 is a perspective view of a seat assembly according to an exemplary embodiment.

Referring generally to the figures and in particular to FIG. 1, a vehicle 10 having a vehicle seat 12 according an exemplary embodiment is shown. While the vehicle 10 shown is a 4-door sedan, it should be understood that the seat 12 may be used in a mini-van, sport utility vehicle or any other means in or by which someone travels or something is carried or conveyed for any market or application including everything from office seating and transportation to planes and space travel and everything in between. The vehicle seat 12 shown includes a seat back 14 and a seat base 16. One exemplary embodiment of a seat structure 12 is shown in FIG. 2. The seat 12 may include a head restraint 18 and a seat base portion (sub-assembly) 20. The head restraint 18 extends upward from the seat back 14 and is configured to restrain the head of an occupant during an impact. The seat base portion 20 may be configured to allow the seat 12 to be selectively positioned (manually or motor driven) relative to the vehicle interior.

Figure 3:
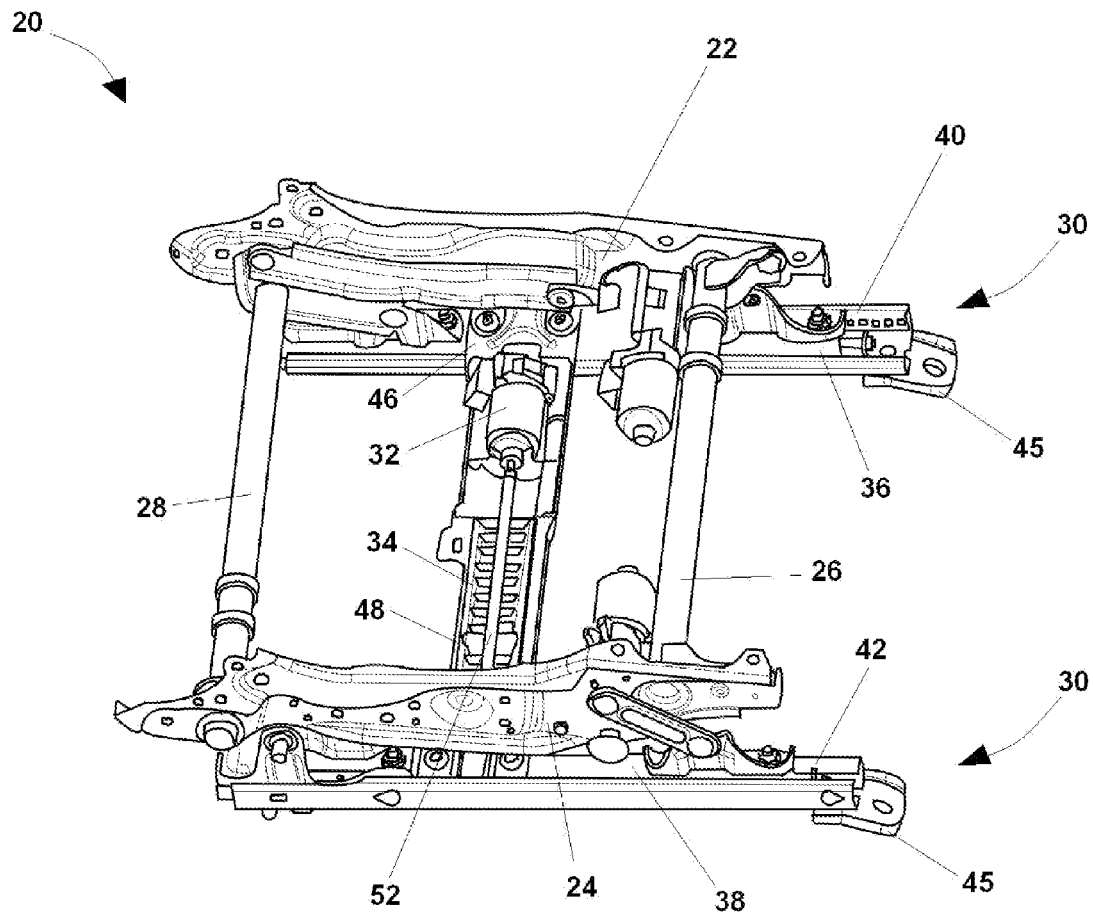
FIG. 3 is a top perspective view of a vehicle seat track assembly according to an exemplary embodiment.
Figure 4:
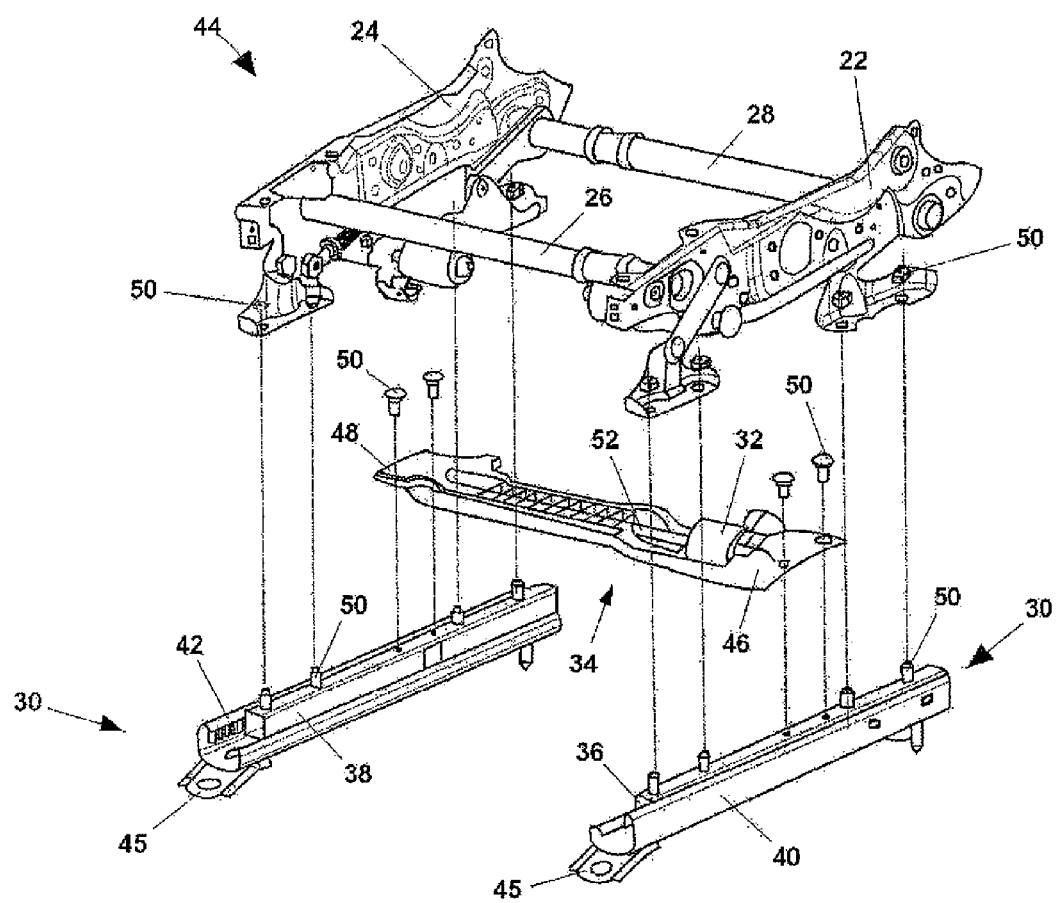
FIG. 4 is an exploded, perspective view of a vehicle seat track assembly having a motor mount bracket according to an exemplary embodiment.
Figure 5:
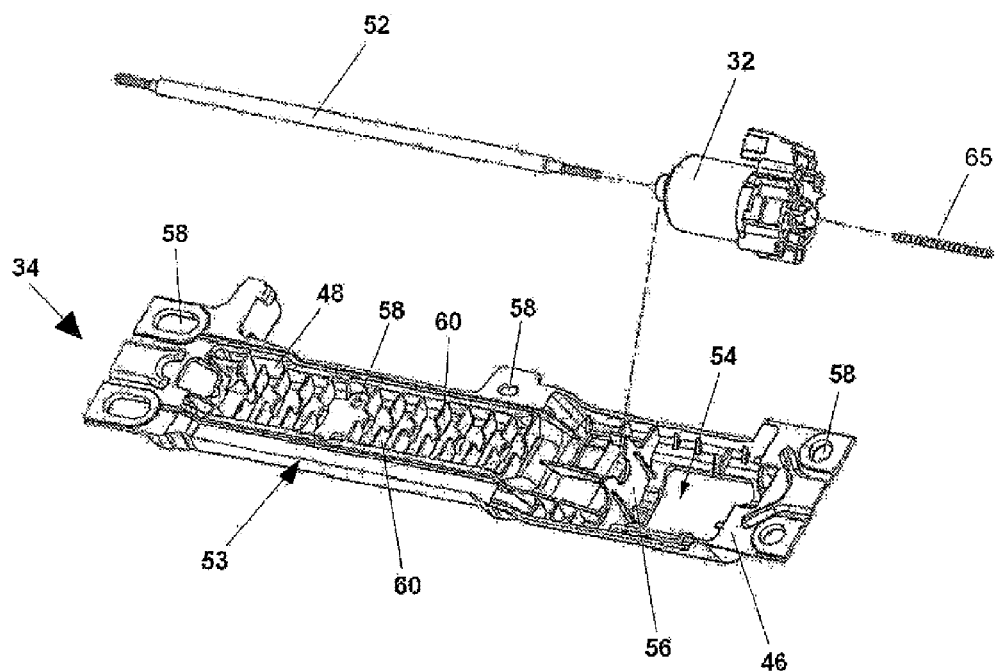
FIG. 5 is an exploded perspective view of the motor mount bracket and motor as shown in FIG. 4 according to an exemplary embodiment.
Figure 6A:
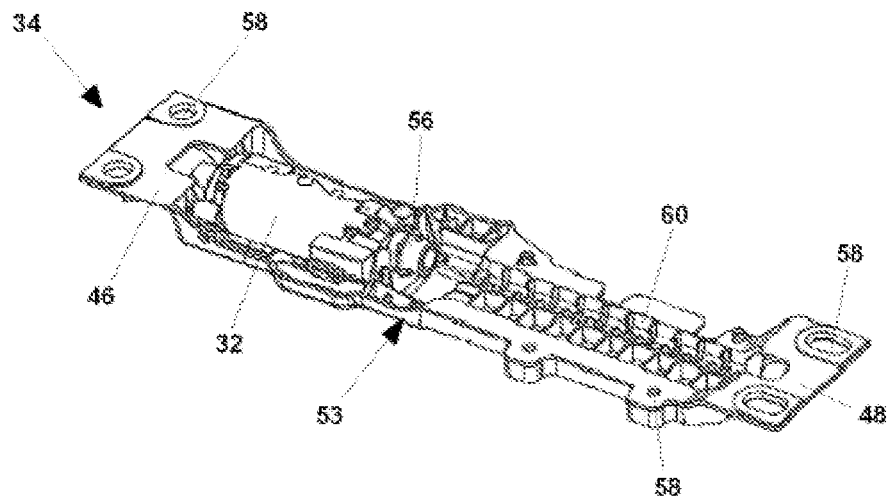
FIG. 6A is a perspective view of the motor mount bracket including a motor of FIGS. 4 and 5 according to an exemplary embodiment.
Figure 6B:
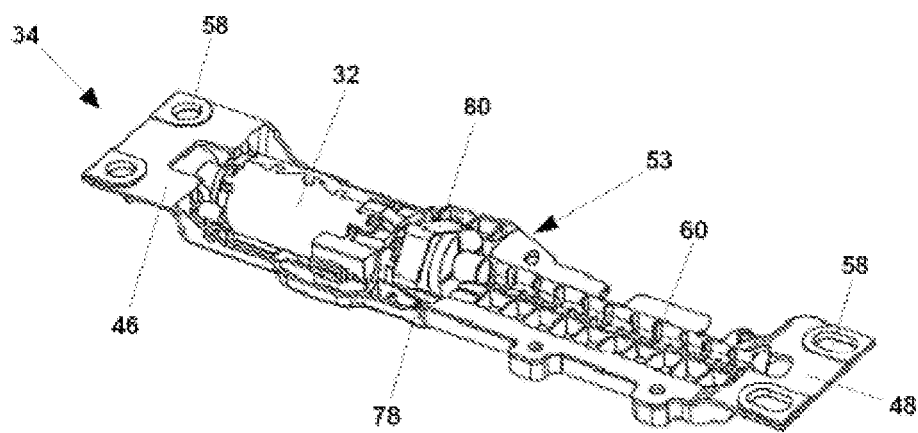
FIG. 6B is a perspective view of the motor mount bracket of FIG. 6A also having a memory sensor according to an exemplary embodiment.
Figure 6C:
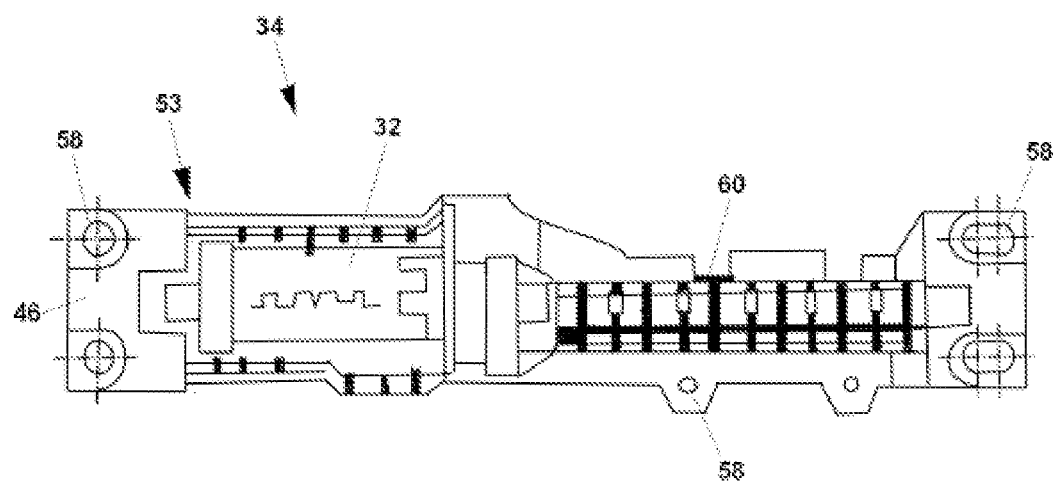
FIG. 6C is a top view of the motor mount bracket of FIG. 6B according to an exemplary embodiment.
Figure 6D:
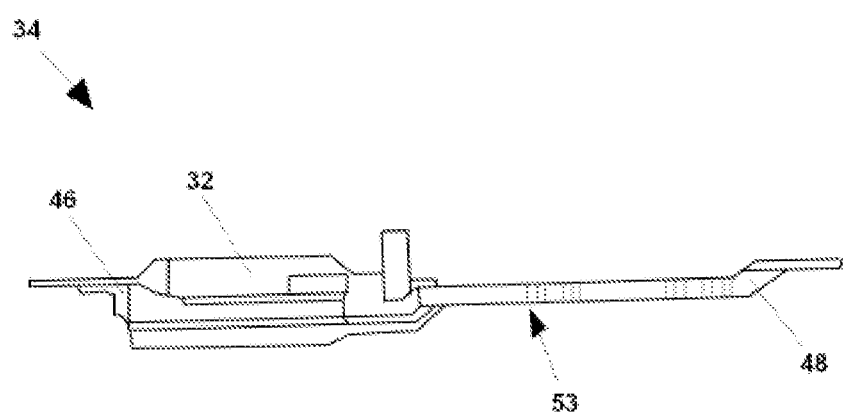
FIG. 6D is a side view of the motor mount bracket of FIG. 6B according to an exemplary embodiment.
Figure 7A:
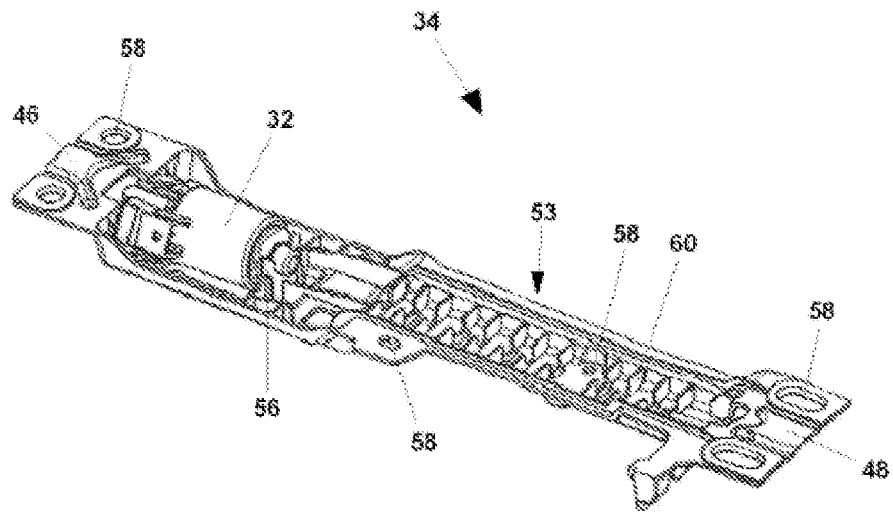
FIG. 7A is a perspective view of an alternate motor mount bracket design including a motor according to an alternate exemplary embodiment.
Figure 7B:
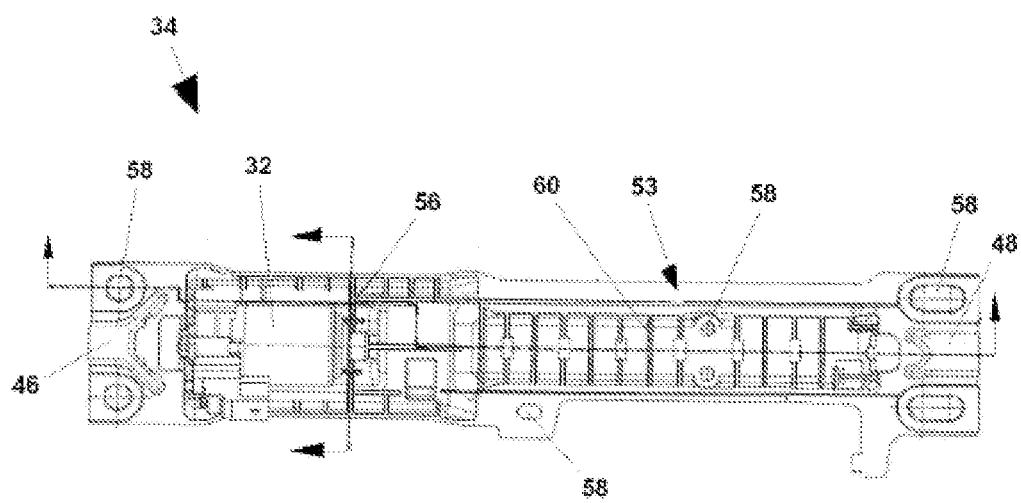
FIG. 7B is a top view of the motor mount bracket of FIG. 7A according to an exemplary embodiment.
Figure 7C:
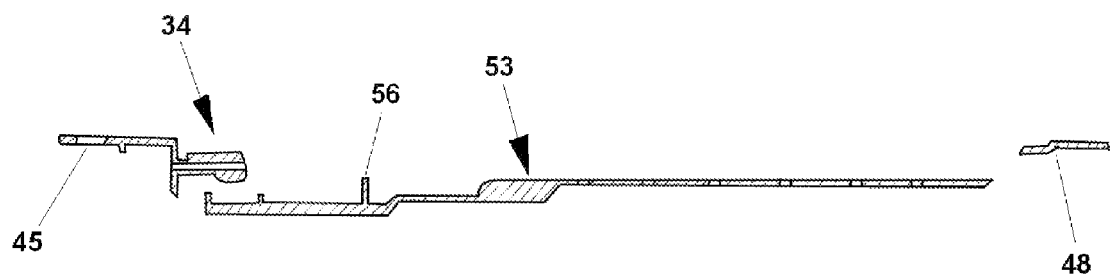
FIG. 7C is a cross-sectional view along the A-A line of the motor mount bracket of FIG. 7B according to an exemplary embodiment.
Figure 7D:
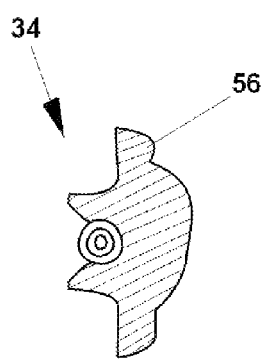
FIG. 7D is a cross-sectional view along the B-B line of the motor mount bracket shown in FIG. 7B according to an exemplary embodiment.
Figure 7E:
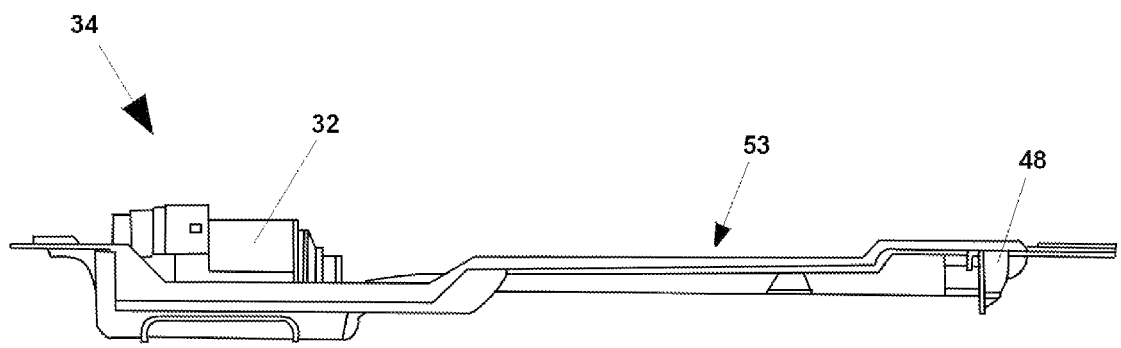
FIG. 7E is a side view of the motor mount bracket shown in FIG. 7A according to an exemplary embodiment.
Figure 7F:
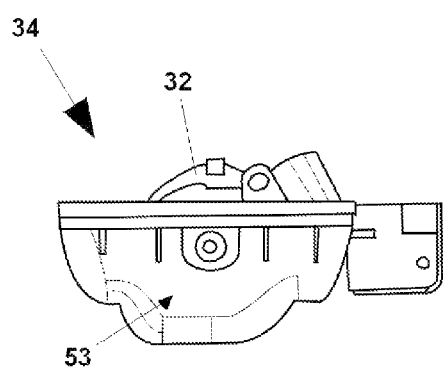
FIG. 7F is an end view of the motor mount bracket of FIG. 7A according to an exemplary embodiment.

Referring now to FIGS. 3 and 4, a seat base sub-assembly 20 is shown. The seat base sub-assembly 20 includes a first (inboard) seat base side member 22, a second (outboard) seat base side member 24, a first (front) cross tube member 26, a second (rear) cross tube member 28, a track assembly 30, a motor 32, and a motor mount bracket 34. The track assembly 30 includes a first (inboard) and second (outboard) upper rail 36, 38 and a first (inboard) and second (outboard) lower rail 38, 40. The first and second seat base side members 22, 24 are coupled together via the first and second cross tube members 26, 28 to form the seat base frame 44. The first and second seat base side members 22, 24 are also coupled to the first and second upper track members (rails) 36, 38, respectively. The first and second upper track members 36, 38 are slidably coupled to the first and second lower track members 40, 42 which, in turn, are designed to be coupled to the vehicle 10 or to brackets 45 that are designed to be coupled to the vehicle 10 (e.g., vehicle floor, etc.). The motor mount bracket 34 is coupled at its first (inboard) end 46 to the first upper track member 36 and coupled at its second (outboard) end 48 to the second upper track member 38, such that the motor mount bracket 34 is substantially perpendicular to both the first and second seat base side members 22, 24. The motor mount bracket 34 is coupled at its first and second ends 46, 48 using any appropriate fastener 50 such as the bolts as shown in FIG. 4 but any known or appropriate coupling device may be utilized. The motor 32 is housed at the first (inboard) end 46 of the motor mount bracket 34 (alternatively, the motor 32 may be housed anywhere along the motor mount bracket 34 including, but not limited to, the outboard end 48 of the motor mount bracket 34), such that the motor 32 and cable 52 are positioned horizontally aligned along a longitudinal axis of the motor mount bracket 34 and the motor 32 is snugly coupled to the motor mount bracket 34.

Referring now to FIGS. 5 through 7F, a motor mount bracket 34 for receiving a motor 32 is shown. The motor mount bracket 34 has an elongated body portion 53 and includes a motor recess 54 and an attachment rib 56 (C-clip opening) for receiving the motor 32 on the motor mount bracket 34. The motor 32 is positioned such that at least a portion of the motor 32 extends toward the motor recess 54 and further such that one end of the motor 32 couples to (or snap fits with such as wherein the material is designed to have an interference fit therewith) into the attachment rib 56 (C-clip opening) to snugly secure the motor 32 in position on the motor mount bracket 34. The motor recess 54 may be designed to house a variety of suitable motors 32 (e.g., Mitsuba, Asmo, etc.) having a variety of shapes and sizes. The motor mount bracket 34 includes a plurality of apertures 58 for coupling/mounting to other components (e.g., track assembly 30, etc.). According to one exemplary embodiment, apertures 58 on the first (inboard) end 46 of the motor mount bracket 34 may be used to receive fasteners 50 for coupling the motor mount bracket 34 to the first (inboard) upper track member 36 and apertures 58 on the second (outboard) end 48 of the motor mount bracket 34 may be used to receive fasteners 50 for coupling the motor mount bracket 34 to the second (outboard) upper track member 38. The motor mount bracket 34 may also include additional apertures 58 (e.g., along the lateral sides, bottom surface area, etc.) of the motor mount bracket 34 for coupling to still other components (e.g., vehicle seat assembly, etc.). The motor mount bracket 34 also includes a plurality of laterally extending, longitudinal motor cable ribs 60 protruding vertically upward from and spaced-apart along the length of a top surface area of the motor mount bracket 34. These motor cable ribs 60 provide rigidity to the motor mount bracket 34 and enable a motor 32 (having various shapes and sizes) and a cable 52 (within a housing) to be placed snugly into position and thereby enhance performance of the vehicle seat track assembly 30 (e.g., reduce noise, etc.). The motor mounting bracket may also include additional recesses 78 for additional components (e.g., a memory sensor 80, etc.), as shown in FIG. 6B.

Figure 8:
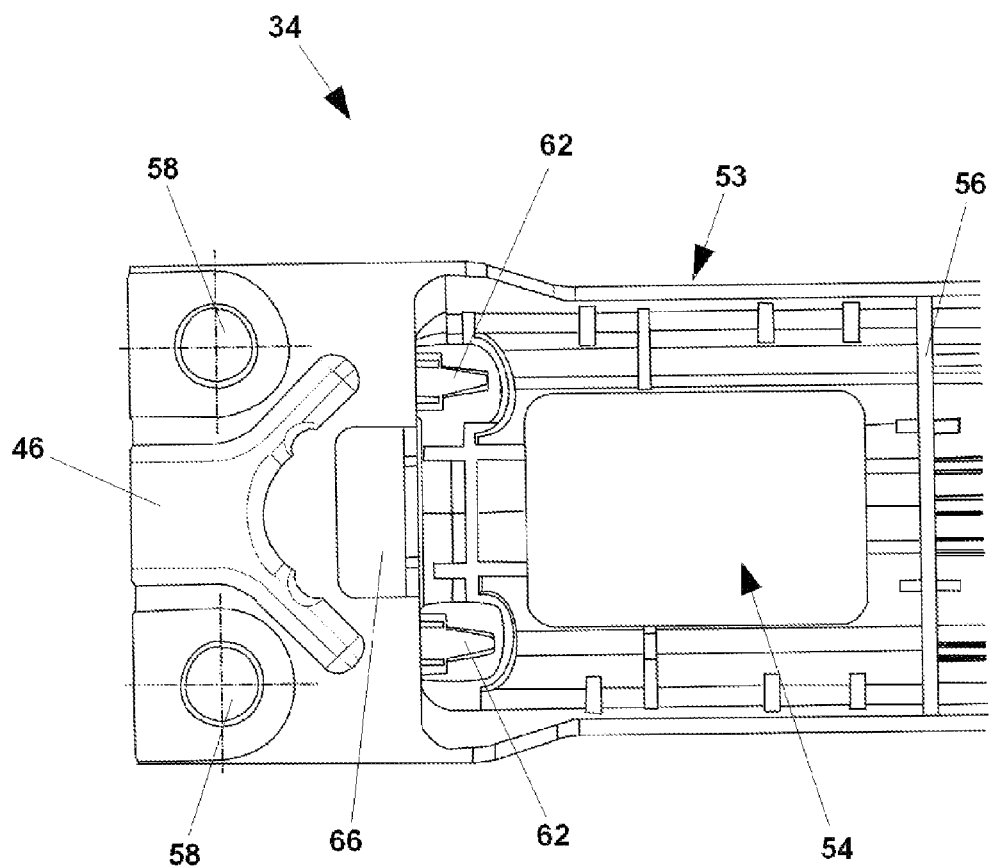
FIG. 8 is a partial, top view of the motor mount bracket of FIG. 7A according to an exemplary embodiment.
Figure 9:
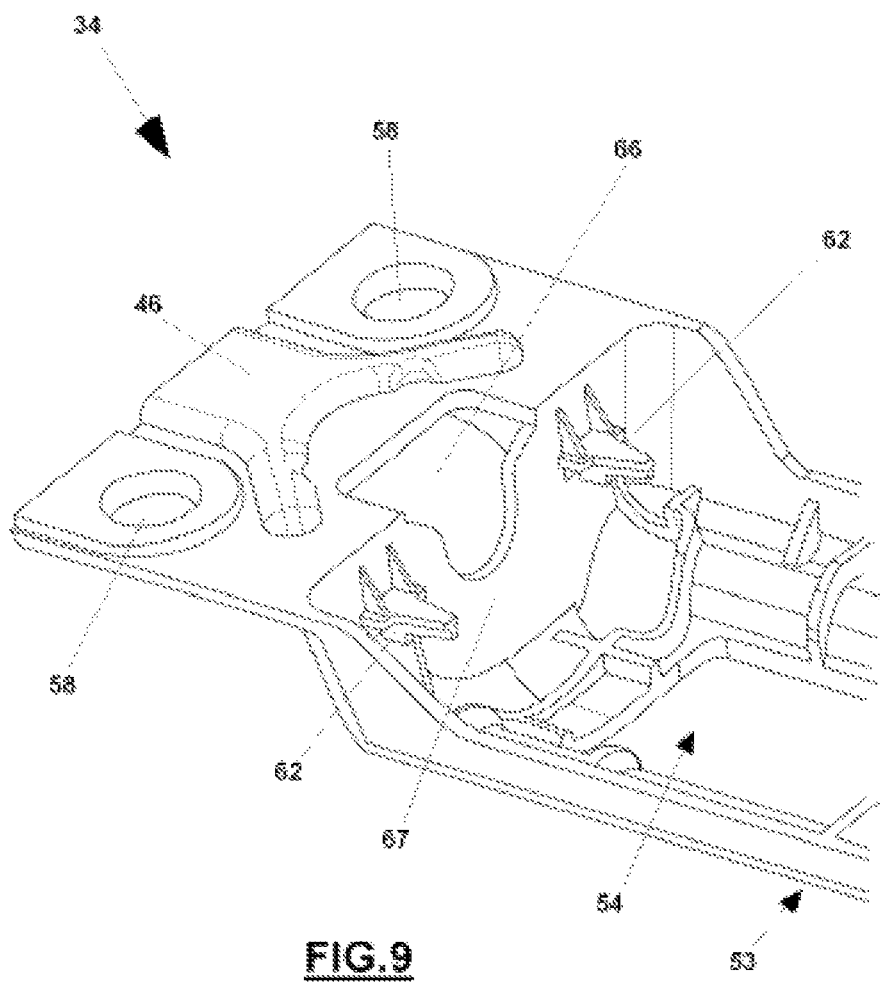
FIG. 9 is a partial, perspective view of the motor mount bracket of FIG. 8 according to an exemplary embodiment.

Referring now to FIGS. 8 and 9, a motor mount bracket 34 according to an exemplary embodiment is shown. The motor mount bracket 34 further includes a pair of motor attachment members 62 (isolators, supports, darts) projecting from the vertical surface area (wall) of the recess 54. According to an exemplary embodiment, the motor attachment members 62 (isolators, supports, darts) are formed integrally with the motor mount bracket 34. Alternatively, it is understood that the motor attachment members 62 (isolators, supports, darts) may be formed separately from the motor mount bracket 34 and may be suitably coupled with the motor mount bracket 34. While two motor attachment members 62 are shown, it is noted that the motor mount bracket 34 may be designed to include any suitable number of motor attachment members 62 (e.g., one or more). The motor mount bracket 34 also includes an opening 66 on the vertical surface area (wall) 67 of the recess 54 for the shaft 65 of the motor 32 to extend toward the track members 36, 40 and connect therewith.

Figure 10:
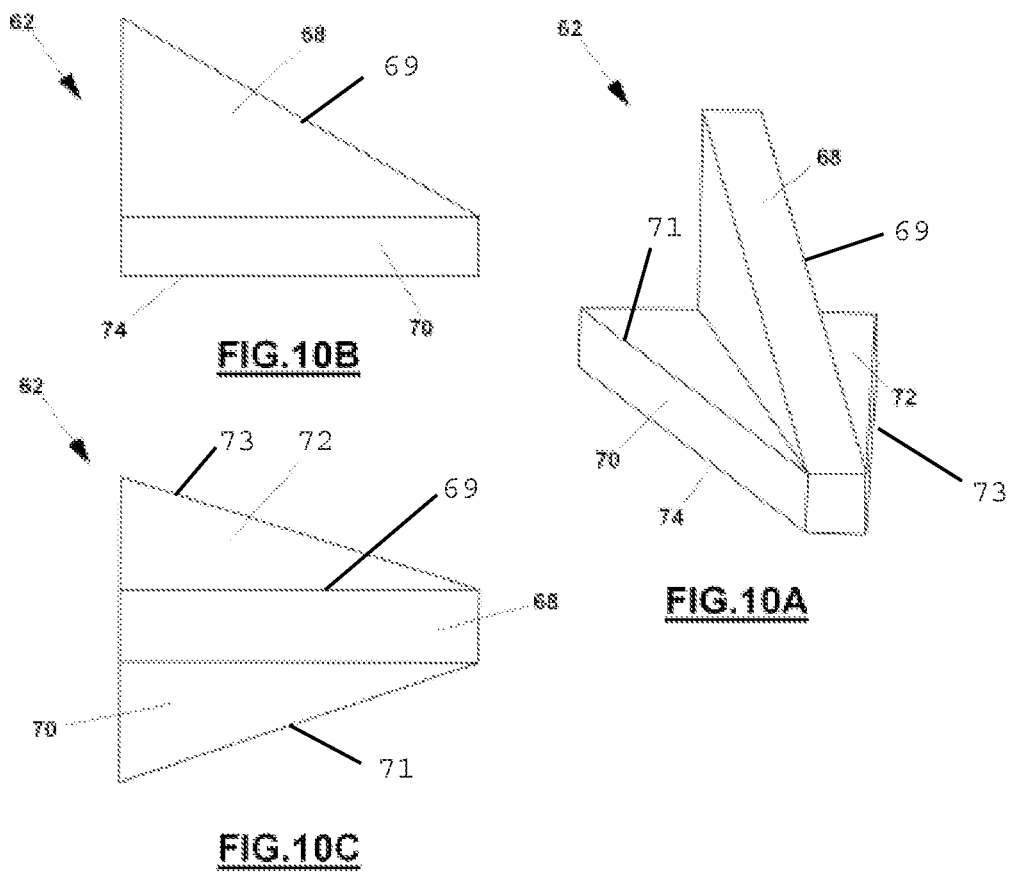
FIG. 10A is a partial, perspective view of an attachment member of the motor mount bracket according to an exemplary embodiment.
FIG. 10B is a partial, side view of the attachment member of FIG. 10A according to an exemplary embodiment.
FIG. 10C is a partial, top view of the attachment member of FIG. 10A according to an exemplary embodiment.

Referring now to FIGS. 10A through 10C, a motor attachment member 62 (isolators, supports, darts) is shown. The motor attachment member 62 is generally triangular or arrow-shaped having a triangular vertical flange 68, a first triangular horizontal (lateral) flange 70, a second triangular horizontal (lateral) flange 72, and a trapezoidal underside surface 74. The vertical flange 68, the first horizontal flange 70, and the second horizontal flange 72 each have an angled surface 69, 71, 73 (e.g., the hypotenuse of each triangular flange) which extends angularly from the front end towards the rear end of the motor attachment member 62. Alternatively, the motor attachment member 62 may have other geometric shapes (e.g., cylindrical, rectangular, etc.) that may be suitable for insertion into a recess or aperture 76 in the motor 32 for supporting and isolating the motor 32 once mounted in the motor mount bracket 34. The angled surfaces may also be designed to have other geometric shapes, contours, etc. The motor attachment members 62 are inserted into recesses or apertures 76 in the motor 32 to provide a biasing force therewith and to snugly fit and hold the motor 32 on the motor mount bracket 34 and aligned with the motor recess 54 and the mounting rib 56. The motor attachment member 62 is preferably made of an elastomeric or rubber material (e.g., in-mold plastic, etc.) and has a number of advantages including, inter alia, enabling angled installation of the horizontal motor 32 on the motor mount bracket 34 and thus enabling rotation of the motor 32 to the horizontal, installed position while ensuring retention of the motor 32 (e.g., allowing the drive cables to recess into their mating components, etc.), and thereby retaining the motor 32 more effectively (e.g., preventing disengagement of the motor from the assembly). It is contemplated that the arrangement shown will allow elimination of a quality check for mis-positioned isolators associated with prior designs and thereby significantly reducing costs (e.g., rubber isolators, screws, etc.). The motor mount bracket 34 and motor attachment member 62 also provide a reduced contact surface to the motor 32 to thereby reduce vibration energy transfer and thereby enhancing acoustic noise performance (e.g., limiting and/or preventing buzzes, squeaks and rattles (a/k/a as BSR)) of the power seat track 30. Further, the motor mount bracket 34 and motor attachment members 62 provide for more efficient and cost-effective manufacturing and assembly of the vehicle power seat track assembly 30 thereby also reducing overall cost.

Figure 11:
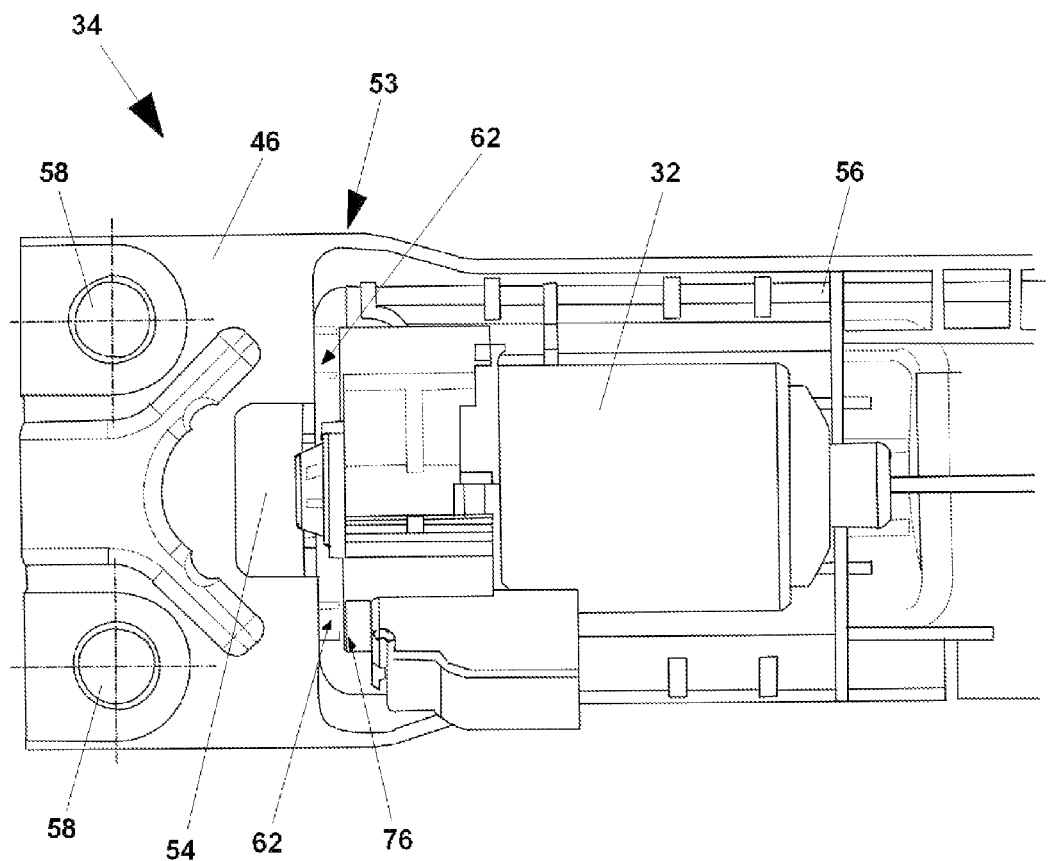
FIG. 11 is a partial, top view of a motor mount bracket including a motor attached thereto according to an exemplary embodiment.
Figure 12:
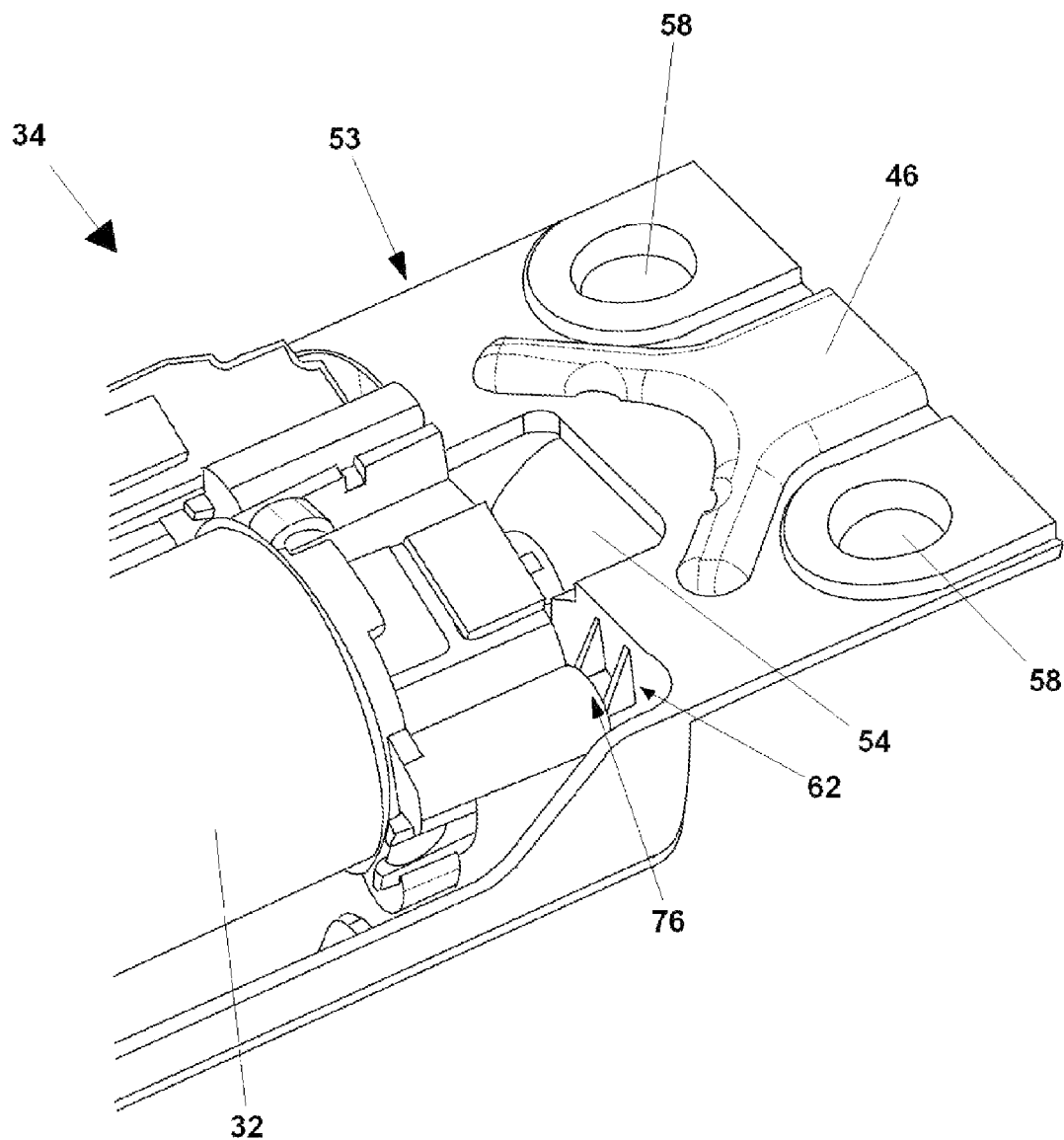
FIG. 12 is a partial, perspective view of a motor mount bracket including a motor attached thereto according to an exemplary embodiment.

FIGS. 11 and 12 show a motor mount bracket 34 having a motor 32 positioned therein. The motor 32 is positioned horizontally along the length of the recess 54 and snugly fits into place via the motor attachment members (darts) 62.

For purposes of this disclosure, the term "coupled" (and its variants) means the joining of two components (electrical or mechanical) directly or indirectly to one another unless specifically stated otherwise. Such coupling or joining may be stationary in nature or movable in nature unless specifically stated otherwise. Such coupling or joining may be achieved with the two components (electrical or mechanical) and any additional intermediate members being integrally formed as a single unitary body with one another or with the two components or the two components and any additional member being attached to one another unless specifically stated otherwise. Such coupling or joining may be permanent in nature or alternatively may be removable or releasable in nature unless specifically stated otherwise.

It is also important to note that the construction and arrangement of the elements of the vehicle seat as shown in the preferred and other exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures and combinations. Accordingly, all such modifications are intended to be included within the scope of the present innovations. Other substitutions, modifications, changes and omissions may be made in the design, operating conditions and arrangement of the preferred and other exemplary embodiments without departing from the spirit of the present innovations.

What is claimed is:

1. A combination of a bracket and a motor mounted on the bracket for driving a motor cable for use in a vehicle seat assembly, the combination comprising:
    a motor;
    a bracket having a longitudinally extending body portion having a first end and a second end, the first and second ends for attaching the bracket to the vehicle seat assembly, the first end of the body portion having a recess for receiving the motor;
    a laterally extending attachment rib projecting upwardly from the body portion and located adjacent the recess; and
    an attachment member projecting horizontally from a vertical surface of the recess and arranged for insertion into a recess in the motor, wherein the attachment member is made of an elastomeric or rubber material, wherein one end of the motor is secured to the attachment rib and an opposed end of the motor is secured to the attachment member for insertion into a recess in the motor for coupling the motor to the bracket.

2. The bracket combination of claim 1, wherein the attachment rib is substantially C-shaped to secure the motor in position via an interference fit.

3. The combination of claim 1, wherein the attachment member comprises a first vertically oriented angled surface portion, a second horizontally oriented angled surface portion and a third horizontally oriented angled surface portion, wherein the first angled surface is positioned between the second and third angled surfaces.

4. The combination of claim 1, wherein the bracket includes a plurality of motor cable ribs spanning the body portion of the bracket for securing the motor cable.

5. The combination of claim 1, wherein the attachment member comprises a first, second and third angled surface each integrated together in a single attachment member, and at least one of the first, second or third angled surfaces has a triangular shape.

6. A vehicle seat assembly, comprising:
    a seat base frame having a first and second side frame member, the first and second side frame member positioned parallel to one another;
    a track assembly coupled to the first and second side frame member, the track assembly having a first upper track member in slidable engagement with a first lower track member and a second upper track member in slidable engagement with a second lower track member;
    a bracket having a first end coupled to the first upper track member and a second end coupled to the second upper track member wherein the bracket includes a longitudinally extending body portion, and a laterally extending attachment rib projecting upwardly from the body portion and an attachment member projecting horizontally from a vertical surface of the recess and arranged for insertion into a recess in a motor, wherein the attachment member is made of an elastomeric or rubber material; and the motor housed within the bracket for adjusting the fore and aft position of the first and second upper track member relative to the first and second lower track member wherein one end of the motor is secured to the attachment rib and opposed end of the motor is secured to the attachment member.

7. The vehicle seat assembly of claim 1, wherein the bracket includes a recess for housing the motor therein and the attachment rib extends vertically from the recess for attaching to the motor and securing the motor in position.

8. The vehicle seat assembly of claim 7, wherein the attachment rib is substantially C-shaped and has an interference fit with the motor to secure the motor in position.

9. The vehicle seat assembly of claim 6, wherein the bracket includes at least one attachment member for insertion into the motor and interlocking the motor to the bracket.

10. The vehicle seat assembly of claim 6, wherein the bracket includes a plurality of motor cable ribs spanning the body portion of the bracket for securing a motor cable therein.

11. The vehicle seat assembly of claim 6, wherein the attachment member comprises a first vertically oriented angled surface portion, a second horizontally oriented angled surface portion and a third horizontally oriented angled surface portion, wherein the first angled surface is positioned between the second and third angled surfaces.

12. The vehicle seat assembly of claim 6, wherein the attachment member comprises a first, second and third angled surface each integrated together in a single attachment member, and at least one of the first, second or third angled surfaces has a triangular shape.

* * * * *